March 16, 1948.　　H. G. FERGUSON　　2,437,879
TWO-WAY PLOW
Filed April 14, 1944　　5 Sheets-Sheet 2

INVENTOR.
Henry George Ferguson
BY
Barnes, Kisselle, Laughlin
& Raisch
Attorneys

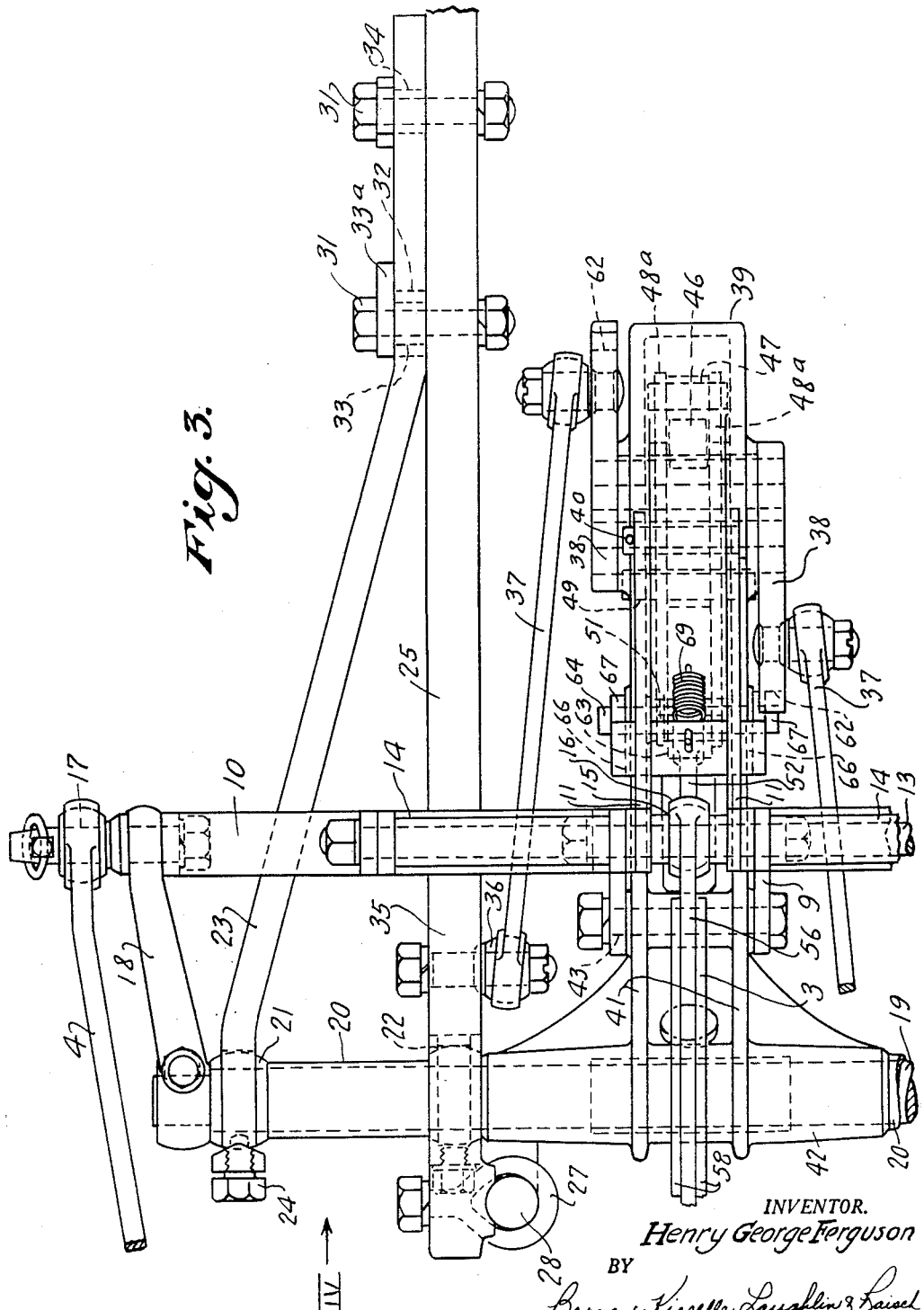

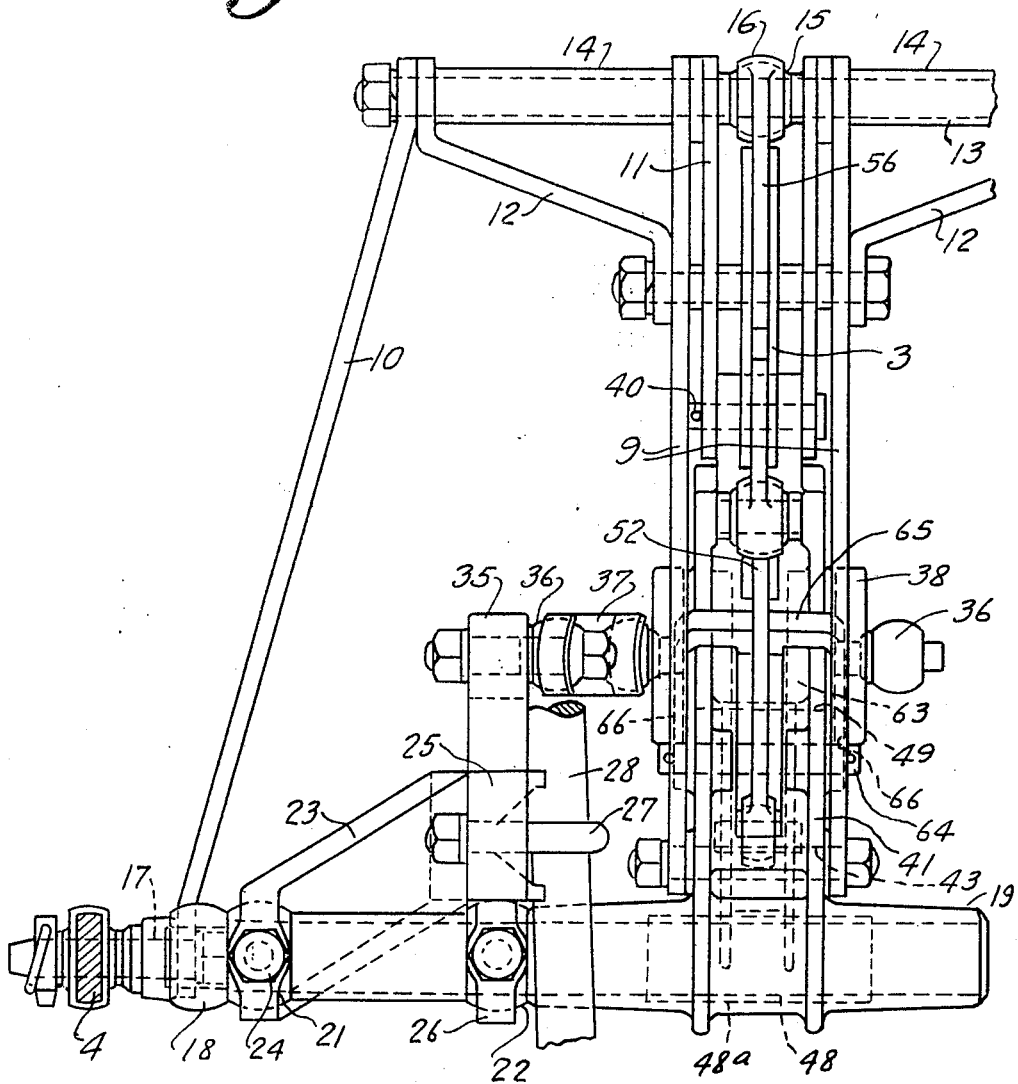

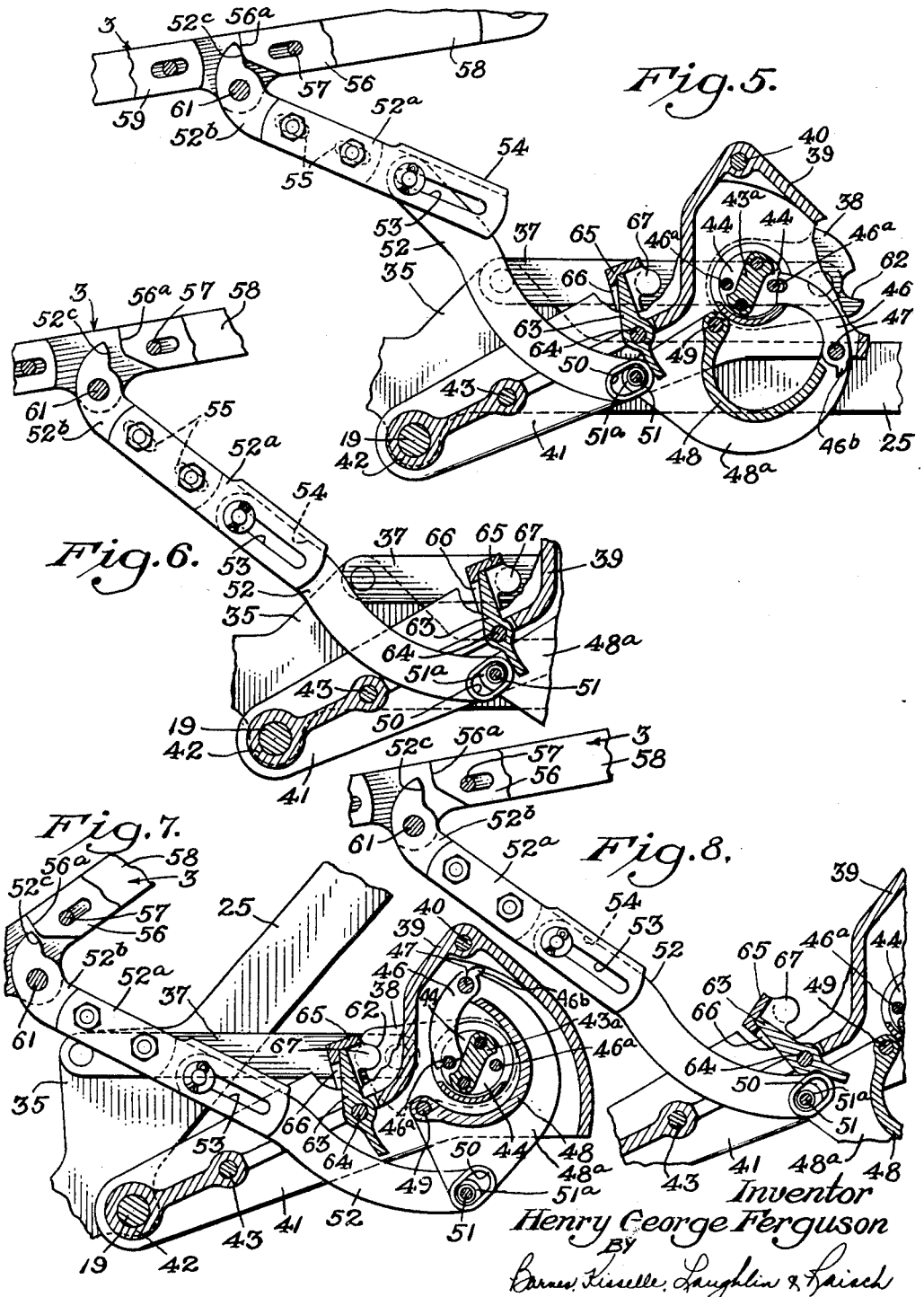

Patented Mar. 16, 1948

2,437,879

UNITED STATES PATENT OFFICE 2,437,879

TWO-WAY PLOW

Henry George Ferguson, Arlington, Belfast, Ireland

Application April 14, 1944, Serial No. 531,018

32 Claims. (Cl. 97—29)

This invention relates to two-way ploughs or the like agricultural implements adapted to be attached to an agricultural tractor and which, as in the case of a two-way plough, comprise two ground-engaging shares or equivalent which can be selectively or alternatively set in ground-engaging position.

An object of the invention is to provide a two-way plough or equivalent especially suitable for attachment to, and control by, a tractor in accordance with the now widely known Ferguson system, some basic features of which, applicable in combination with the present invention are set forth in my prior United States Patents Nos. 1,464,130; 1,687,719; 1,916,945; 2,195,515; 2,118,180; and 2,118,181.

A further object of the invention is to effect the change over of the ploughs automatically as a result of raising or lowering of the plough unit as a whole by means of the power unit which is provided in the Ferguson system for raising and lowering the implements on the tractor.

A further object is to provide an arrangement which automatically changes over the ploughs when the plough unit as a whole is being raised to transport position but which remains inoperative during the up and down movements of the plough unit as allowed by the Ferguson hitch linkage system when ploughing uneven land. The automatic change over however, can be manually controlled so as not to effect the change over on lifting the implement frame.

The invention, in fact, has a broader and a wider aspect than the operation of the two-way plough. In its broadest view the invention affords a device, operated by vertical movement of the hitch links, which is arranged to do work on or in connection with a trailing implement.

The invention will now be described by way of example with reference to the accompanying drawings in which:

Fig. 3 is a plan view of the plough, only the right hand plough being shown.

Fig. 4 is a corresponding rear view in the direction of arrow IV, Fig. 3.

Fig. 5 is a fragmentary view corresponding to Fig. 2 and showing the change-over mechanism and its actuating means in the position assumed during ploughing.

Fig. 6 is a similar view showing the change-over mechanism and its associated parts as they appear at the beginning of the change-over operation.

Fig. 7 is a view similar to Figs. 5 and 6 showing the parts as they appear at the end of the change-over operation.

Fig. 8 is a view similar to Fig. 6, but somewhat more fragmentary, illustrating the release of the detent means.

Figure 1:
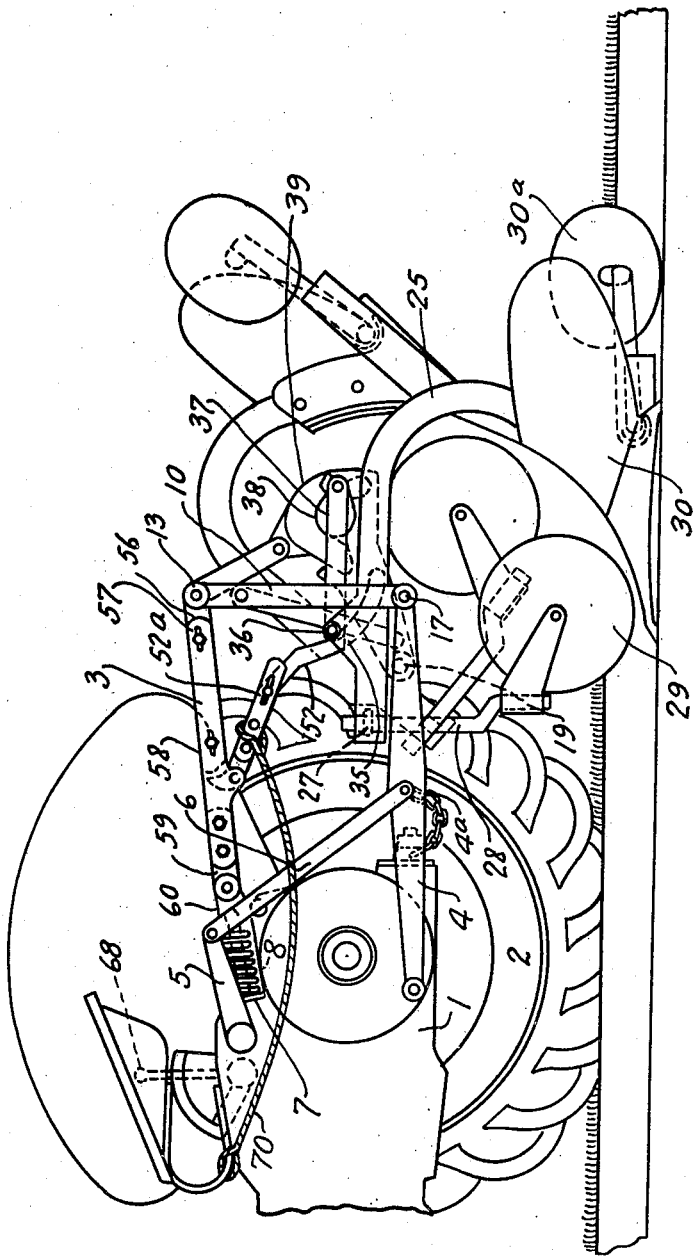
Fig. 1 is a side view of the rear of a Ford-Ferguson tractor with a two-way plough in accordance with the present invention attached thereto, one of the rear wheels being omitted for clearness.

Referring especially to Fig. 1, the tractor is of the well-known Ford-Ferguson type embodying the Ferguson linkage and implement control system. The tractor comprises a body casing 1 and the usual two rear ground wheels 2, the nearer wheel being omitted for clearness. The linkage system comprises an upper compression link 3 and two laterally spaced lower draft links 4, the links being triangularly spaced and universally attached to the tractor and implement. The tractor embodies a fluid-power unit (not shown) which operates the cranks 5 and serves to raise and lower the links 4 through the drop links 6 and thus raise and lower the implement with a substantially parallel motion. For the purpose of the present invention it is not necessary to describe the tractor in detail but reference will be made to some of the basic features of the Ferguson system. The forward convergence of the upper and lower links gives a favorable line of draft tending to keep the implement in the ground as in prior Patent No. 1,464,130, and the implement is automatically controlled for depth of cut in accordance with the principle set out in my Prior Patent No. 1,687,719; the fluid-power unit and depth control being substantially as set forth in my prior Patents Nos. 2,118,180 and 2,118,181. Briefly this is effected in that the soil pressure or draft is transmitted as a thrust through the compression link 3 to the balance spring 7. If the implement depth varies the draft varies and the spring 7 is either further compressed or released allowing the control rod 8 to shift a valve (not shown) to move and operate the power unit either to lower or raise the implement and so keep it at the proper depth. This is fully shown and described in Patent No. 2,118,180 and Patent No. 2,118,181.

The lower links 4 converge (Fig. 3) forwardly in order to cause the implement to follow closely the steering of the tractor as in my prior Patent No. 1,916,945, and are provided with check chains 4a as disclosed in my prior U. S. Patent No. 2,223,002.

The two-way plough unit or assembly in accordance with the invention comprises a frame structure (Fig. 4) consisting of pairs of spaced upright or substantially upright members 9, 10 and 11 and two oblique braces or cross stiffeners 12. These members carry a top cross shaft 13, being spaced thereon by three sleeves 14 of which the middle one carries a ball 15 universally engaged by the socketted end 16 of the top link 3. Attached to the lower ends of uprights 10 are pins 17 (Fig. 3) adapted to engage universal balls located similarly to ball 15 in the ends of the lower draft links 4. Thus the ball 15 and pins 17 constitute triangularly spaced attachment elements for universal attachment of the plough unit to the tractor. Also attached to the lower ends of uprights 10 (Fig. 3) are arms 18 clamped to a cross shaft 19 for carrying the ploughs. At the outer ends the shaft 19 carries two sleeves 20 each formed at each end with a universal ball member 21 and 22. Each ball member 21 is engaged by the socketted end of a bracing beam 23 retained on the ball by a screw 24 so as to be capable of rocking movement on the ball. Each plough beam 25 has a downward projection 26 (Fig. 2) similarly engaging the ball member 22 (Fig. 3). The forward end of the plough beam carries an eye 27 (Figs. 2 and 3) for adjustably clamping the stem 28 of a disc coulter 29 (Fig. 1) and at the rear end the beam is downwardly curved in the usual manner and carries the plough 30. Each plough has a ground-engaging member 30a as disclosed in my prior U. S. Patent No. 2,195,515.

The bracing beams 23 are connected to the plough beams by two bolts 31. The front bolt passes through a longitudinal slot 32 in the bracing beam 23 and through an eccentric sleeve 33 engaging the slot, the sleeve being formed with an operating projection 33a. The rear bolt 31 also passes through a similar eccentric sleeve 34 which however, is a close fit in the bracing beam. On slackening the bolts 31 and turning the rear eccentric sleeve 34, the bracing beam and plough beam can be relatively moved longitudinally when the plough is moved laterally to adjust the furrow width, the slot 32 and the engagement with the balls 21 and 22 permitting this movement. They can also be relatively moved or adjusted pivotally about the axis of the rear bolt by turning the sleeve 33. The universal connections of the beams 23, 25 with the shaft 19 permit this relative adjustment which has the effect of rocking the plough about the longitudinal axis of the beam 25 to give the plough the correct tilt with reference to the tractor.

The change-over mechanism for the ploughs comprises an upward projection 35 (Fig. 2) on each plough beam 25 carrying a universal ball member 36 (Fig. 3) universally engaged by the socketted end of a connecting rod 37 similarly connected at its other end to a crank 38, the two cranks (one at each side, see Fig. 3) being set 180° from each other and being carried by a casing 39 fixed to the plough frame. The casing 39 is connected at the top (Fig. 2) by a pin 40 to link members 11, and two webs 41 carrying a sleeve 42 form an arm which is fulcrumed upon the cross shaft 19. The webs are also connected by a pin 43 to the uprights 9. The cranks are mounted on a shaft 43a (Figs. 2 and 5 to 8, inclusive) which is cut away at 44 to accommodate two ratchet pins 46a which pass through shaft 43a from end to end and serve to fix the cranks 38 to the shaft 43a (see Fig. 3). The pins are adapted to be engaged by a pawl 46 pivoted at 47 on the pawl carrier 48 located at the open bottom of the casing 39 and pivoted thereto at the center 49. The carrier is channelled and hence comprises two webs 48a and has a pin 51 carrying a ball 51a (Figs. 5 to 7) freely engaging a slot 50 at the bottom of a hinged thrust link consisting of a lower part 52 having a pin at its other end engaging a slot 53 in an intermediate part 52a which is double and has a cross piece 54 adapted to engage the lower part 52 as hereinafter explained. The double part 52a is connected to an upper part 52b by bolts engaging slots 55 whereby the length of the composite thrust link can be adjusted. The upper link 3 consists of a part 56 (Fig. 3) universally connected to the ball 15 (Figs. 2 and 4) and connected by bolts and slots 57 (Fig. 2) to a double intermediate part 58 whereby the length of the composite link can be adjusted. Said double part is bolted to a single part 59 (Figs. 1 and 2) universally connected to the rocker 60 pivotally mounted on the end of the tractor and connected to the control rod 8. The function and operation of this control rod are fully disclosed in my Patents Nos. 2,118,180 and 2,118,181. The upper part 52b (see Figs. 5 and 8) is pivoted inside the double part 58 at 61 and has a nose 52c adapted to cooperate with the end 56a of the single part 56 as hereinafter described.

A crank-locking detent mechanism (Figs. 5 to 8) is provided which consists of a detent recess 62 in each crank and a double detent comprising a trigger 63 pivoted on a pin 64 in the casing 39 and engaging at its lower end with the lower end 52 of the hinged thrust link. The top end of the trigger engages a cross piece or yoke 65 having two arms 66 (Fig. 3) also pivoted on the pin 64 and each having a detent projection 67, one on each side of the yoke (see Fig. 3), one adapted to engage the corresponding recess 62, when the arm 38 is thrown over to the forward position, as shown in Fig. 7.

Figures 2, 2A:
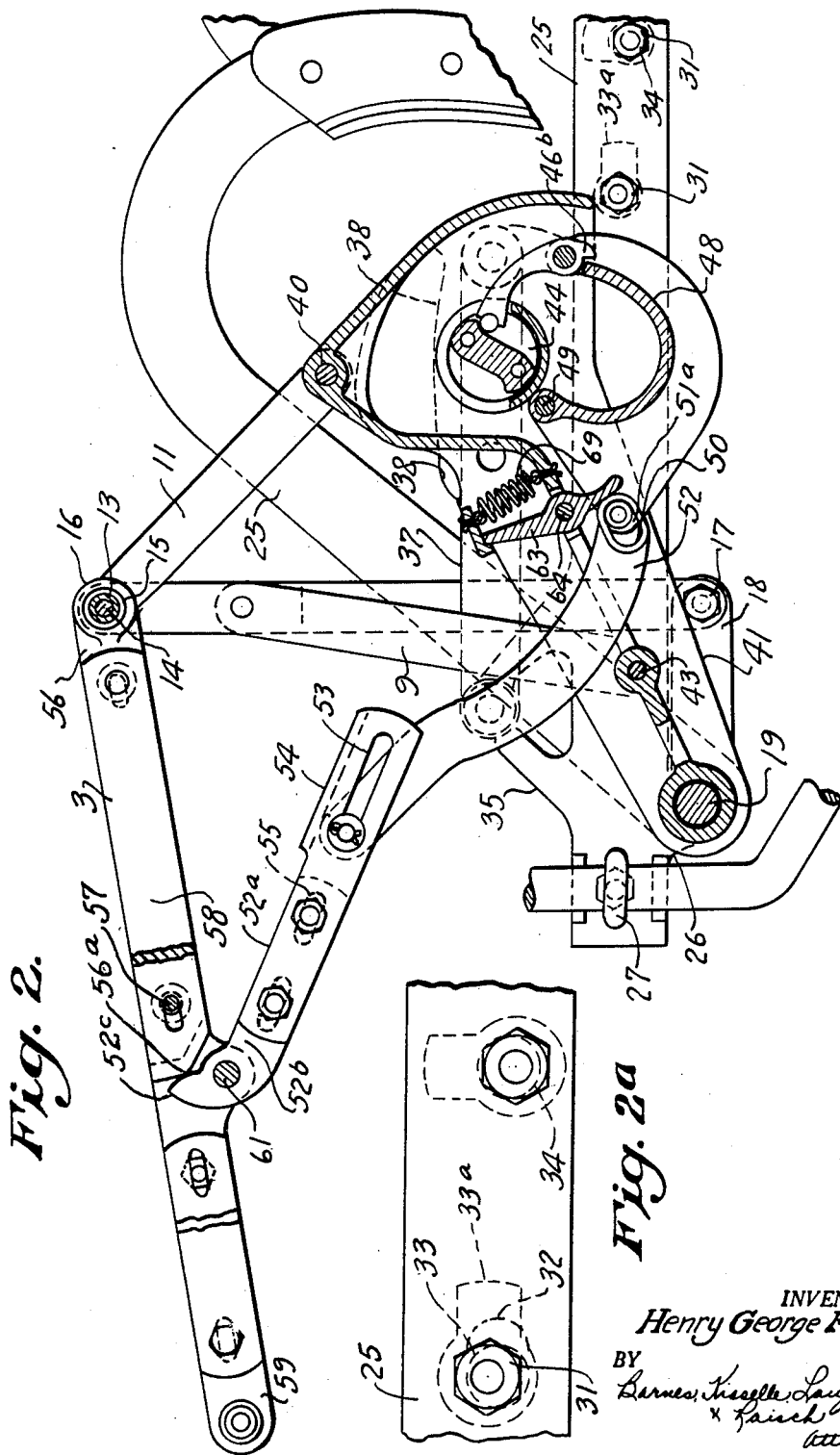
Fig. 2 is a side, sectional view to a larger scale of the ploughs, showing the details of the change-over mechanism.
Fig. 2a is an enlarged fragmentary view of plough-adjusting means.

The position shown in full lines in Fig. 2 is that when the left-hand plough is in working position, the right-hand plough beam 25 is shown in the inoperative or raised position.

For the sake of simplicity in illustrating the operation of the mechanism, the views which show successive operative positions of the parts (Figs. 2 and 5 to 8) indicate that the front end of the link 3 moves downwardly. Actually the rear end of this link rises during operation. These relative movements, however, are clearly represented and the essential thereof is the closing in of the link 3 to the crank center in the casing 39 as representative of the implement structure as a whole, whereby an actuating force for implement control is imparted to the thrust link.

In operation with the thrust link broken as in Fig. 5, the plough unit can rise and fall freely on the links 3 and 4 as necessitated, for instance, when ploughing uneven ground. During ploughing the draft on the operative plough causes a compressive stress in the upper link 3 so that the parts 56 and 58 are moved together and the end 56a of part 56 engages the nose 52c so that the hinged thrust link is flexed (see Fig. 2). If the plough rises the thrust link merely flexes or "breaks" further and does not operate the change-over and if the plough falls this is allowed by the slot 53 in the double part 52a of the thrust link.

If, however, the power unit is set in operation by the hand lever 68 to raise the plough unit to transport position, the drop links 6 commence to raise the plough unit and the draft on the operative plough decreases until a point is reached where the rear overhanging weight of the unit more than balances the draft and the top link is put under tension so that the part 56 moves back to the position shown in Fig. 6. This allows the hinged link parts 52 and 52a to fall by gravity substantially to an aligned position (see Fig. 6) in which the hinged link is slightly over center and is capable of transmitting a thrust due to the cross piece 54 engaging the lower part 52.

A thrust force on the links 52, 52a is developed as the hitch links 3, 4 are moved upwardly as a result of the vertically spaced pivoted relationship of the hitch links to the tractor and to the vertically spaced shafts 13 and 19 respectively on the implement frame. Since the vertical spacing of the pivot points of these thrust links are constant the links must shift relative to each other and to the implement as they move vertically.

This relative movement of the implement, hitch links and tractor, and particularly the relative approaching movement of the upper link 3 to the vertically extending part of the implement frame, produces a thrust force by the thrust links 52, 52a for operating the control mechanism of the implement which in this embodiment shifts the ploughs. Thus the rising movement of the implement to the transport position first causes the lower end of the thrust link 52, 52a to ride up the ball 51a and operate the trigger 63 against the spring 69 to remove the detent 67 from the recess 62 of the left side crank (shown in Fig. 3). This position of the parts is also shown in Fig. 8, except that the crank arm 38 does not appear since in this view it is the forward crank arm on the near side of the mechanism. However, the relationship of the parts would be the same as that shown in Fig. 7. Thereafter the pawl carrier 48 is rotated to the position shown in Fig. 6 and the pawl 46 rotates the cranks 180° whereupon the other (right side) crank is, as shown in Fig. 7, engaged by the detent and locked. Hence, when the plough unit has been raised to transport position the plough that was operative is raised and the other is relatively lowered ready for operation when the unit is lowered again. On this occurring the pawl carrier 48 returns the pawl to the lower position (shown in Figs. 2 and 5) under gravity, the pawl having a stop 46b (Fig. 2) to prevent it falling outwards. It will be noted that the diameter of the path of the ratchet pins 46a is relatively small compared with the diameter of the path of the pivot connection 47 of the pawl and hence a less than 90° rotation of the carrier produces a 180° rotation of the crank.

Referring to Fig. 7, it will be seen that the thrust of the pawl 46 on the ratchet pin 46a, when the cranks have been swung 180° and one of the detent pins 67 is engaging in the detent slot 62, is just over on the dead center; that is, a straight line through pins 49 and 47. More movement of the pawl carrier 48 will cause the pawl to disengage from the ratchet pin and the thrust link is ineffective to turn the cranks more than 180° and at the same time the linkage is not caused to lock or jam by reason of the thrust link locking the folding arms from approaching closer together.

It will be seen that with the arrangement described the plough, while in operation, can move freely up and down with reference to the tractor as the contour of the ground may require without operating the change over and yet the major part of the raising movement, when the implement is being raised to transport position clear of the ground can be used for effecting the change over. It will also be noted that when either plough is in working position the cranks 38 and connecting rods 37 are in "dead center" position (see Figs. 5 and 7) so that the minimum effort is required by the detent to lock the mechanism against displacement while ploughing.

Means may be provided to prevent the change-over when the plough unit is lifted, for example, to clear an obstruction and when it is desired to put the same plough back into the ground. This means may simply consist of a cord, cable 70 or the like attached to the thrust link and whereby the operator on the tractor can hold the thrust link 52, 52a up in the flexed position.

The point in the rising movement of the plough unit at which the parts 56, 58 of the upper link move apart may be varied by spring loading these parts.

This application is a continuation in part of my forfeited application Serial No. 403,583, filed July 22, 1941.

What I claim is:

1. In combination a tractor including a power unit, hitch means for connecting an agricultural implement to the tractor comprising link means adapted to be raised and lowered by said power unit and a two-way plough carried by said link means comprising two ploughs capable of relative up and down movement so as to be selectively engageable with the soil, and change-over means for causing said relative up and down movement between the ploughs, said change-over means being connected to the link means so as to be actuated automatically as a result of vertical movement of said link means.

2. A two-way plough unit adapted for attachment to a tractor including upper and lower hitch link means pivotally attached thereto, said plough unit comprising a frame, two ploughs carried thereby and capable of relative up and down movement, upper and lower attachment elements on said frame for pivotal connection with said link means so that the plough unit is capable of up or down movement with reference to the tractor, a change-over mechanism for causing said relative up and down movement of said ploughs, and a connection between said mechanism and the hitch link means whereby said mechanism is automatically operated by the angular movement of said link means relative to the plough unit during up or down movement of said unit with reference to the tractor.

3. For use with a tractor including a power unit and upper and lower hitch link means for connecting an agricultural implement to the tractor so as to be capable of up and down movement and be raised and lowered by said power unit, the upper and lower link means being respectively under compressive and tensile stress when the implement is being drawn through the soil; a two-way plough unit comprising upper and lower attachment means for pivotal attachment to said link means, two ploughs capable of relative up and down movement so as to be selectively engageable with the soil, change-over mechanism for causing said relative up and down movement automatically as a result of vertical movement of the plough unit, and means for rendering said mechanism inoperative when a plough is being drawn through the soil to prevent change over when the vertical movement is due to ploughing uneven ground.

4. For use with a tractor including a power unit and upper and lower hitch link means for connecting an agricultural implement to the tractor so as to be capable of up and down movement and be raised and lowered by said power unit, the upper and lower link means being respectively under compressive and tensile stress when the implement is being drawn through the soil; a two-way plough unit comprising upper and lower attachment means for pivotal attachment to said link means, two ploughs capable of relative up and down movement so as to be selectively engageable with the soil, change-over mechanism for causing said relative up and down movement, a connection from the link means to said mechanism to cause operation of same automatically as a result of upward movement of the plough unit, said connection being operative only on change of stress in the link means due to the operative plough being raised by the power unit from normal soil-engaging position.

5. For use with a tractor including a power unit and upper and lower hitch link means for connecting an agricultural implement to the tractor so as to be capable of up and down movement and be raised and lowered by said power unit, the upper and lower link means being respectively under compressive and tensile stress when the implement is being drawn through the soil, a two-way plough unit comprising a frame, upper and lower attachment means on said frame for pivotal attachment to said link means, two ploughs pivotally attached to said frame and capable of relative up and down movement, a change-over crank device connected to each plough for simultaneously raising one plough and lowering the other, connecting means between the hitch link means and said crank device to cause same to change over the ploughs when the plough unit is being raised by said power unit to transport position, and control means sensitive to draft pressure on the plough to render said connecting means inoperative when the normal stress due to ploughing is exerted on the link means.

6. A plough as claimed in claim 5, in which said upper compression link means comprises a hitch link consisting of parts capable of relative axial movement and said connecting means comprises a hinged link pivotally connected to one of said parts and capable of flexing freely to only one side, the hinged link being engaged by another part of said hitch link and held flexed to the one side so that it cannot transmit a thrust to the crank device while the upper link is subjected to the compressive stress due to ploughing, said hinged link being caused to straighten to a rigid position when the plough is being raised to transport position by the power unit so as to transmit an operative thrust from said upper hitch link to the crank device to change over the ploughs.

7. For use with a tractor including a power unit and upper and lower hitch link means for connecting an agricultural implement to the tractor so as to be capable of up and down movement and be raised and lowered by said power unit, the upper and lower link means being respectively under compressive and tensile stress when the implement is being drawn through the soil; a two-way plough unit comprising upper and lower attachment means for pivotal attachment to said link means, two ploughs capable of relative up and down movement so as to be selectively engageable with the soil, a crank mechanism connected by a connecting rod to each plough for causing said relative up and down movement automatically as a result of vertical movement of the plough unit and means for locking said mechanism when a plough is in operative position on the plough unit, the crank and connecting rod of said plough being in or near dead center position when the said plough is in operative position.

8. A two-way plough unit as claimed in claim 7, having a connection from said link means to said crank mechanism to cause operation of same automatically as a result of upward movement of the plough unit, the said connection being adapted to free the locking means first before operating the crank mechanism.

9. For use with a tractor including a power unit and upper and lower hitch link means for connecting an agricultural implement to the tractor so as to be capable of up and down movement and be raised and lowered by said power unit, the upper and lower link means being respectively under compressive and tensile stress when the implement is being drawn through the soil; a two-way plough unit comprising upper and lower attachment means for pivotal attachment to said link means, two ploughs capable of relative up and down movement so as to be selectively engageable with the soil, a crank mechanism for causing said relative up and down movement, an operating link between the link means and said mechanism to operate the latter automatically when the hitch link means angles with reference to the unit during vertical movement of the plough unit in one direction, a pawl device between the operating link and said mechanism adapted to disengage from said mechanism during vertical movement of the plough unit in the other direction, and means for locking the crank device when a plough is in operative position on the unit.

10. A plough unit as claimed in claim 9, in which said pawl device comprises at least two ratchet members on the crank, a pivoted pawl carrier connected to said operating link, a pawl in pushing engagement with one of said ratchet members, said pawl and pawl carrier being in pivotal engagement and so arranged that pivoting movement of the carrier causes turning of said crank and being of such length that at a predetermined crank position additional movement of said pawl carrier produces no additional advancement of said crank so that the latter cannot be overdriven by excessive movement of said pawl carrier.

11. In combination a tractor including a power unit, a two-way plough unit, the tractor having a control member for the power unit, sensitive to variations of the soil pressure or draft on the plough, and a hitch connection comprising upper and lower hitch link means pivotally connected to the tractor and to the plough unit so as to allow vertical movement of the plough unit with reference to the tractor, said upper and lower link means being respectively subjected to compressive and tensile stress due to the soil pressure or draft on the operative plough and means for transmitting draft variations to said control member to cause the power unit to raise or lower the operative plough and maintain the plough at a predetermined depth of cut, said plough unit comprising a frame structure attached to said links, two ploughs mounted on said frame and capable of relative up and down movement so as to be selectively engageable with the soil and change-over mechanism for causing said relative up and down movement between the ploughs, and means for actuating said mechanism automatically as a result of vertical movement of the hitch means.

12. A two-way plough having, in combination, a frame, two plough beams each carrying a plough, a crank mechanism for relatively raising and lowering the ploughs, a connecting rod between and universally attached to the mechanism and each beam, a bracing beam for each plough beam, a universal connection for each bracing beam with said frame, and means adjustably securing said bracing beams and plough beams to permit relative movement thereof longitudinally and vertically to permit either lateral or torsional adjustment of the ploughs or both.

13. In an agricultural implement for operation by a tractor having a power unit, the combination of ground engaging means relatively movable for selective engagement with the ground, link means for connecting said implement with the power unit for moving said implement vertically between an operative ground engaging position and an inoperative transport position, said link means having relative shifting movement to said implement in the vertical movement of said implement, and means operated by such relative shifting movement for effecting the relative shifting movement of said ground engaging means.

14. In an agricultural implement for operation by a tractor having implement hitch means and means for raising and lowering implements connected therewith, the combination of ground engaging means supported for relative up and down movement for selective engagement with the ground, means for connecting the implement with the hitch means, the connecting means permitting relative movement between the implement and said hitch means during the vertical movement of the implement, actuating means on the implement for effecting said relative up and down movement of said ground engaging means, and means interposed between said hitch means and said actuating means for translating the relative movement between said implement and hitch means into operative movement of said actuating means.

15. In an agricultural implement for operation by a tractor having means thereon for raising and lowering an implement connected with a tractor, the combination of ground engaging means supported for relative movement for selective engagement with the ground, means for connecting said implement with the raising and lowering means on the tractor for bodily movement between a lowered operative position and an elevated transport position, mechanism for shifting said ground engaging means through the relative movements thereof, and means for actuating the shifting mechanism as the implement as a whole moves vertically.

16. In an agricultural implement for operation by a tractor having means thereon for raising and lowering an implement connected with a tractor, the combination of ground engaging means supported for relative movement for selective engagement with the ground, means for connecting said implement with the raising and lowering means on the tractor for bodily movement between a lowered operative position and an elevated transport position, mechanism for shifting said ground engaging means through the relative movements thereof, means for actuating the shifting mechanism as the implement as a whole moves vertically, and means for disabling the actuating means to prevent such operation of said shifting mechanism.

17. In combination with a tractor having vertically spaced and vertically movable hitch links for connecting an implement to the tractor, an implement pivotally connected with said links for vertical movement therewith, power means on said tractor for moving said links and said implement vertically, said implement including two ground engaging members supported for relative up and down movement alternately into ground engaging position, means for so moving said members, and actuating means connecting one of said links with the member moving means for actuating the latter in the upward vertical movement of said links.

18. In combination with a tractor having a power unit thereon for vertically moving an implement connected with the tractor and vertically spaced hitch links for connecting an implement to the tractor, said links being vertically movable, an implement connected with said hitch links for vertical movement therewith and including two ploughs supported for relative vertical movement into alternate engagement with the ground, said hitch links and implement having relative pivotal movement in the vertical movement of said implement, and means actuated by said relative pivotal movement for relatively moving said ploughs.

19. In a tractor trailing implement setup, the combination of a tractor provided with a power operated lift, an implement frame, an implement supported thereby, a hitch connecting the implement frame with the tractor and having connection with the power operated lift for elevating and lowering the frame and motion transmission means adapted to do work in connection with said implement additional to raising and lowering said frame and in the form of a limited revolution device supported by the implement frame and means for actuating said device operated by the raising of the hitch.

20. In a tractor trailing implement setup, the combination of a tractor provided with a power operated lift, an implement, a frame for supporting the same, a hitch connecting the implement frame with the tractor and having connection with the power operated lift for elevating and lowering the frame and motion transmission means in the form of limited revolution device supported by the implement frame and operated by the raising and lowering of the hitch to do selected work additional to the lifting of the frame, said hitch comprising upper and lower links connecting the implement frame to the tractor and said motion transmission means including a thrust element operating to provide thrust when the power elevating means lifts the links and causes the said links and the implement frame to fold together.

21. The combination claimed in claim 20 in which the said thrust member comprises a pair of pivoted links, which links are inactive to transmit thrust when the links are at one side of a straight-line position but are effective as a thrust member when the links are on or over the straight-line position.

22. The combination claimed in claim 20 in which the said thrust member comprises a pair of pivoted links, which links are inactive to transmit thrust when the links are at one side of a straight-line position but are effective as a thrust member when the links are on or over the straight-line position, the upper hitch link comprising a pair of longitudinal shiftable parts, one part serving under normal operation of the implement to engage one of the links of the thrust member to keep the links broken from a straight-line position to prevent thrust and serving, when the hitch links are elevated, to shift and release the contact with one of the links and allow the links to assume a straight-line position and become an effective thrust member.

23. The combination claimed in claim 20 in which the limited revolution device has a pivoted pawl carrier, a pawl and a ratchet member.

24. The combination claimed in claim 20 in which the limited revolution device has a pivoted pawl carrier, a pawl and a ratchet member, the pawl and the pawl carrier arranged with respect to the ratchet member so that after the pawl has driven the ratchet member one-half a revolution the pawl will automatically disconnect itself from engagement with the ratchet member.

25. In an agricultural implement for operation by a tractor having means thereon for raising and lowering an implement connected with a tractor, the combination of ground engaging means supported for relative movement for selective engagement with the ground, means for connecting said implement with the raising and lowering means on the tractor for bodily movement between a lowered operative position and an elevated transport position, mechanism for shifting said ground engaging means through the relative movements thereof, means actuated by the vertical movement of the said raising and lowering means for operating the shifting mechanism, and means for holding said shifting mechanism against movement when the raising and lowering means is idle.

26. In apparatus of the character described, the combination of an implement having power operable means thereon for controlling implement operation and hitch means for connecting said implement with a tractor having power means for vertically moving said hitch means, connecting means between said hitch means and said implement permitting relative pivotal movement therebetween in the vertical movement of said hitch means, and means responsive to and deriving force from said relative pivotal movement for actuating said power operable means.

27. An implement for connection with and operation by a tractor having power operated vertically movable hitch means capable of lifting said implement comprising the combination of means for pivotally connecting said implement with said hitch means to provide for relative pivotal movement therebetween when the hitch means and the implement are moved vertically, and means on said implement connectable with said hitch means for deriving operative power from the weight of the implement pivoting with respect to said hitch means as vertical movement occurs.

28. In a hitch for connecting to a tractor having power lift means thereon, an implement having mechanism controlling the operation of the implement, the combination of vertically movable hitch links for pivotal connection respectively with the tractor and with the implement, the points of such pivotal connections being vertically spaced with respect to said tractor and to said implement, means for connecting said links with the power lift means on the tractor for controlling the vertical movement of said links, said links forming the upper and lower sides respectively of a quadrilateral linkage of which a portion of the tractor and implement respectively form the vertical sides, a member pivotally anchored to one of the sides of said quadrilateral linkage and extending diagonally across the latter, and means responsive to the relative movement of the unanchored end of said member with respect to a given point on one of the remaining sides of said quadrilateral linkage occurring upon the raising of said links for actuating said control mechanism.

29. In an implement for use with a tractor having upper and lower trailingly pivoted hitch links thereon and having a power lift device for raising the lower link, the combination comprising connecting means for connecting the trailing ends of said links to said implement, control means including a shiftable control connection located near the end of said lower link for causing said implement to operate under first and second alternative conditions as said control connection is moved to one or the other of its limit positions, and a control member pivoted to the central portion of said upper link and extending diagonally downward into engagement with said control connection so that the latter is forceably moved between its limit positions upon the raising and lowering respectively of the implement by said power lift device.

30. In a hitch for connecting to a tractor having a power lift device an implement having a hitch connection and an actuatable mechanism movable between alternative limit positions for controlling implement operation, the combination comprising a lower draft link adapted for pivotal connection at its forward end to the tractor and including means for attaching the tractor power lift device for raising and lowering the link about its pivotal connection, an upper link also adapted at its forward end for pivotal connection to the tractor to trailingly extend from the tractor generally above and parallel with said first link, an operating linkage having one portion operatively associated with said hitch links for movement therewith and having another portion connectable to the actuatable mechanism on said implement for effecting movement of said operating linkage and said actuatable mechanism in response to vertical movement of said hitch links.

31. In a hitch for connecting to a tractor having a power lift device thereon an implement having a hitch connection and an actuatable mechanism movable between alternative limit positions for controlling implement operation, the combination comprising upper and lower hitch links adapted at their forward ends for pivotal connection to the tractor, the lower link having means for attaching the power lift device for raising the lower link and for permitting it to lower about its pivotal connection, means including a member extending vertically between the trailing ends of said links and pivoted to the same, said means including a hitch point for attachment of the hitch connection of said implement, and an operating linkage having one portion thereof supported by at least one of said hitch links and movable as the latter are raised and lowered, said operating linkage being so arranged that another portion thereof moves with respect to the hitch point and in unison with said first portion to actuate said actuatable mechanism.

32. In a hitch for connecting to a tractor having a power lift device thereon an implement having a hitch connection and an actuatable mechanism movable between alternative limit positions for controlling implement operation, the combination comprising a first draft link adapted for pivotal connection at its forward end to the tractor and including means for attaching the tractor power lift device for raising the link and permitting it to lower about its pivotal connection, a second link also adapted at its forward end for pivotal connection to the tractor to trailingly extend from the tractor generally above and parallel with said first link, means including a third link extending vertically between the trailing ends of said first and second links and pivoted to the same, said last mentioned means also including a hitch point for attachment to the hitch connection of the implement, and an operating linkage having one portion thereof supported by at least one of said links independently of the tractor and movable as the links are raised and lowered, said operating linkage having another portion movable in unison with said first portion and relative to said hitch point to actuate said actuatable mechanism.

HENRY GEORGE FERGUSON.

REFERENCES CITED

The following references are of record in the file of this patent:

FOREIGN PATENTS

| Number | Country | Date |
| --- | --- | --- |
| 473,798 | France | Oct. 15, 1914 |

Certificate of Correction

Patent No. 2,437,879.  March 16, 1948.

HENRY GEORGE FERGUSON

It is hereby certified that error appears in the printed specification of the above numbered patent requiring correction as follows:

In the heading to the printed specification, line 5, after "Serial No. 531,018" insert *In Great Britain, July 22, 1940;*
and that the said Letters Patent should be read with this correction therein that the same may conform to the record of the case in the Patent Office.

Signed and sealed this 31st day of May, A. D. 1949.

[SEAL]

THOMAS F. MURPHY,
*Assistant Commissioner of Patents.*